United States Patent
Rozploch et al.

(10) Patent No.: US 9,953,210 B1
(45) Date of Patent: Apr. 24, 2018

(54) APPARATUS, SYSTEMS AND METHODS FOR IMPROVED FACIAL DETECTION AND RECOGNITION IN VEHICLE INSPECTION SECURITY SYSTEMS

(71) Applicant: Gatekeeper, Inc., Sterling, VA (US)

(72) Inventors: Robert Rozploch, Newtown, PA (US); Diego Garrido, Philadelphia, PA (US); Marc Hansen, Hamilton, NJ (US)

(73) Assignee: Gatekeeper Inc., Sterling, VA (US)

( * ) Notice: Subject to any disclaimer, the term of this patent is extended or adjusted under 35 U.S.C. 154(b) by 0 days.

(21) Appl. No.: 15/608,422

(22) Filed: May 30, 2017

(51) Int. Cl.
 *G06K 9/00* (2006.01)
(52) U.S. Cl.
 CPC ..... *G06K 9/00228* (2013.01); *G06K 9/00288* (2013.01); *G06K 9/00838* (2013.01); *G06K 2209/15* (2013.01)
(58) Field of Classification Search
 CPC ........... G06K 9/00228; G06K 9/00288; G06K 9/00838; G06K 2209/15
 See application file for complete search history.

(56) References Cited

U.S. PATENT DOCUMENTS

| | | | |
|---|---|---|---|
| 6,313,946 B1 | 11/2001 | Petitto et al. | |
| 6,400,835 B1 * | 6/2002 | Lemelson | B60Q 1/0023 307/10.5 |
| 6,459,764 B1 | 10/2002 | Chalmers et al. | |
| 6,611,200 B2 | 8/2003 | Pressnall et al. | |
| 6,958,676 B1 | 10/2005 | Morgan et al. | |
| 6,972,693 B2 | 12/2005 | Brown et al. | |
| 7,602,947 B1 * | 10/2009 | Lemelson | B60Q 1/0023 340/426.1 |
| 7,642,899 B2 | 1/2010 | Alvarado et al. | |
| 8,005,267 B2 | 8/2011 | Chew | |
| 8,054,182 B2 | 11/2011 | Cutchis | |
| 8,155,384 B2 | 4/2012 | Chew | |

(Continued)

FOREIGN PATENT DOCUMENTS

| | | |
|---|---|---|
| CN | 102682295 | 9/2012 |
| CN | 104024827 | 5/2016 |

(Continued)

*Primary Examiner* — Sean Conner
*Assistant Examiner* — Pinalben Patel
(74) *Attorney, Agent, or Firm* — Williams Mullen; Thomas F. Bergert (57) ABSTRACT

Devices, systems, and methods provide for improved facial detection and facial recognition in vehicle interior inspections. In various embodiments, one or more high-resolution cameras having one or more lens and filter attachments operate in conjunction with one or more auxiliary illumination devices and a related computer system. According to various embodiments, an auxiliary illumination device can be synchronized to one or more cameras, and configured to supply auxiliary illumination to facilitate capture of accurate and usable images. The filter(s) and advanced image processing solutions assist with facial detection and identifying individuals inside a vehicle, removing light glare and undesired reflections from a window surface, and capturing an image through a tinted window, among other things. Further, embodiments can compare a captured image to an authenticated image from a database, in order to confirm the identity of a vehicle occupant.

22 Claims, 7 Drawing Sheets

(56) References Cited

U.S. PATENT DOCUMENTS

| | | | |
|---|---|---|---|
| 9,230,183 B2 | 1/2016 | Bechtel et al. | |
| 9,256,794 B2 | 2/2016 | Braithwaite et al. | |
| 9,471,838 B2 | 10/2016 | Miller et al. | |
| 9,533,687 B2 | 1/2017 | Lisseman et al. | |
| 9,552,524 B2 | 1/2017 | Artan et al. | |
| 9,623,878 B2 | 4/2017 | Tan et al. | |
| 2003/0209893 A1 | 11/2003 | Breed et al. | |
| 2005/0110610 A1* | 5/2005 | Bazakos | G06K 9/00228 340/5.82 |
| 2007/0030350 A1 | 2/2007 | Wagner | |
| 2011/0242285 A1* | 10/2011 | Byren | G01B 11/24 348/47 |
| 2012/0140079 A1 | 6/2012 | Millar | |
| 2013/0266196 A1* | 10/2013 | Kono | G07C 9/00158 382/118 |
| 2014/0029005 A1 | 1/2014 | Fiess et al. | |
| 2014/0285315 A1 | 9/2014 | Wiewiora | |
| 2015/0262024 A1* | 9/2015 | Braithwaite | G06K 9/00255 382/118 |
| 2015/0278617 A1* | 10/2015 | Oami | G06T 1/60 382/103 |
| 2015/0286883 A1* | 10/2015 | Xu | G06K 9/00228 382/103 |
| 2016/0253331 A1* | 9/2016 | Roshen | G06F 17/30675 707/728 |
| 2016/0300410 A1* | 10/2016 | Jones | G06K 9/00288 |
| 2017/0068863 A1* | 3/2017 | Rattner | G06K 9/00838 |
| 2017/0076140 A1* | 3/2017 | Waniguchi | H04N 5/23293 |
| 2017/0106892 A1* | 4/2017 | Lisseman | B62D 1/046 |

FOREIGN PATENT DOCUMENTS

| | | |
|---|---|---|
| CN | 105785472 | 7/2016 |
| DE | 10101341 | 7/2002 |
| DE | 102015002802 | 8/2015 |
| DE | 102014214352 | 1/2016 |
| JP | 04366008 | 11/2009 |
| JP | 05997871 | 9/2016 |
| KR | 1252671 | 4/2013 |
| KR | 1514444 | 4/2015 |
| KR | 1628390 | 6/2016 |
| WO | 2012160251 | 11/2012 |
| WO | 2016183408 | 11/2016 |

* cited by examiner

APPARATUS, SYSTEMS AND METHODS FOR IMPROVED FACIAL DETECTION AND RECOGNITION IN VEHICLE INSPECTION SECURITY SYSTEMS

TECHNICAL FIELD

The present disclosure relates to visual inspection systems, and more particularly to enhanced devices, systems and methods for improved facial detection and recognition in vehicle interior inspections.

BACKGROUND

Governments, businesses and even individuals are seeking more effective and efficient methods for improving traffic control and increasing the security at vehicle entry points to physical locations, particularly for secure facilities. Various technology solutions can identify a given vehicle at an entry point, and searches can be undertaken, both externally and internally, to identify any potential threats. To a limited degree, some technology solutions can identify drivers and passengers in a vehicle at an entry point, but such solutions require the occupant(s) such as the driver and/or passenger to stop, open the window and present some form of identification document, such as a photo identification or RFID proximity card, for example, or some form of biometric information that may be scanned by facial or retinal cameras, for example. This vehicle occupant identification process is time consuming and often not practical to handle high traffic volume. Further, the extra identification time may also not be appropriate for vehicles carrying special privilege occupants that are not willing to undergo routine security procedures.

In addition, efforts to inspect vehicle interiors through a barrier such as a window, or while a vehicle is moving, face constraints. For example, significant variability exists in ambient and vehicle cabin lighting conditions, weather conditions, window reflectivity, and window tint. These variations raise numerous challenges to conventional imagery-based identification systems. For example, light reflection from a window surface can render an image nearly useless, and heavy glass tinting can make identifying an individual inside a vehicle next to impossible. Another challenge with face detection in vehicle interiors through glass and other barriers is the fact that the human occupants in the vehicles can be occluded. For example, face occlusion problems can be caused by opaque parts of the vehicle blocking the occupant's face, the motion of occupants and the accidental positioning of hands on the face. Further, face detection algorithms do not perform well on face profile images. Face detection algorithms are designed for frontal face profiles.

Solutions are needed that allow for a rapid and minimally invasive facial detection and identification of vehicle occupants and contents. Further, solutions are needed that overcome the challenges associated with variable lighting, weather conditions, window tint, and light reflection. When combined with other forms of identification, such as the vehicle's license plate, under-vehicle scanned imagery, radio-frequency identification tags, facial detection provides an additional level of authentication that can provide both enhanced security with the ability to identify vehicles and their occupants. Additionally, by clearly identifying occupants in a given vehicle as part of a multi-factor authentication process, the throughput, or rate at which vehicles can pass through a security checkpoint, can be significantly enhanced.

SUMMARY

The present disclosure relates to devices, systems, and methods for enhancing the inspection of vehicles, and in particular, the facial detection of occupants inside vehicles. Embodiments can include one or more high resolution cameras, one or more auxiliary illumination devices, one or more optical filters and one or more processing units. According to various embodiments, an auxiliary illumination device can be synchronized to one or more cameras, and configured to supply auxiliary illumination. For example, auxiliary illumination may be supplied in approximately the same direction as an image capture, at about the same moment as an image capture, and/or at about a similar light frequency as the image capture.

Embodiments can further include a computer system or camera with one or more embedded processing units configured to operate advanced image processing functions, routines, algorithms and processes. An advanced image processing device and methodology according to the present disclosure can include processes for detecting faces and identifying individuals inside a vehicle, comparing currently captured images of individuals to stored images of individuals, removing light glare and undesired reflections from a window surface, and capturing an image through a tinted window, among other things. For example, an algorithm can compare different images of the same target vehicle/occupant and use the differences between the images to enhance the image and/or reduce or eliminate unwanted visual artifacts. Further, an algorithm can compare a captured image to an authenticated image from a database, to confirm the identity of a vehicle occupant, for example. Embodiments can be deployed in various fixed and mobile scenarios, such as facility ingress and egress locations, traffic control environments, law enforcement uses for vehicle occupant identification, inside large government, business or industrial complexes and facilities, border crossings, and at secure parking facilities, among other locations. The form and size of components described herein may vary from application to application.

Facial detection in accordance with the present disclosure permits the system to identify the number of occupants of a vehicle and present obtained facial images in a cropped digital image format to a face recognition algorithm, for example. As an additional feature, the face detection algorithm can provide positional information of the occupants in the vehicle. For example, the system can identify the driver, front-seat occupants, and back-seat occupants. In various embodiments, after detecting faces and/or facial images, the system can operate to recognize the face, i.e., attribute the face to a specific individual.

The system and device of the present disclosure is versatile and overcomes the technical problem of providing consistently accurate face detection in various lighting environments, including changing lighting environments. Generally, face detection algorithms are not designed to take into account multiple illumination sources. Face detection algorithms also do not take into account that imaging of faces may have to be done behind windshields, including windshields of various levels of tinting. Imaging through windshields and uncontrollable lighting conditions such as sun light can generate very powerful glare over the acquired digital image. This glare in digital pictures is generally not possible to remove using image processing techniques like contrast enhancement or histogram equalization. As such, the present disclosure contemplates other approaches to remove this glare.

According to various embodiments of the present disclosure, optical polarizing filters and spectral filters are used to mitigate the negative imaging artifacts and reflections created by multiple uncontrollable light sources, thus improving the image quality for facial detection and recognition. Polarizing filters can increase color saturation and decrease reflections and cannot be replicated using digital image processing techniques. In various embodiments, a polarizing filter is placed in front of the camera lens in photography in order to manage reflections or suppress glare. Sky light can become partially linearly-polarized upon reflecting off of a windshield. A linear polarizer can be used to significantly reduce the amount of light reflecting off of the windshield while allowing the un-polarized light reflected off of an occupant's face to pass to the camera sensor, enabling the ability to clearly capture images of faces inside the vehicle previously obscured by sky reflections.

A spectral bandpass filter can also be used to allow transmission of the illumination source's spectral wavelengths to the imaging sensor, while blocking out the majority of signal created by uncontrollable light sources. In various embodiments, the illumination is pulsed to illuminate for a short duration, timed to occur during the duration of the camera's exposure/integration time. This short pulse of illumination with a short integration time allows the imaging system to acquire photons from the scene dominated by those created by the illuminator, while rejecting light created by other sources day or night. This combination of techniques creates an imaging environment that is primarily dominated by the controlled imaging performance of the illumination and spectral filtering which reduces the interference created by uncontrollable light sources.

In various embodiments, the facial detection algorithm of the present disclosure requires significant contrast of the passenger's face to identify the location of that passenger and accurately identify that a face is located within the digital image. In many cases, an image that has undergone image enhancements will produce an image of higher contrast, creating a higher probability that the face detection algorithm will successfully identify a face in the digital image. Therefore, image enhancements can be introduced before the image is processed by the facial detection algorithm in accordance with various embodiments of the present disclosure.

In order to diminish problems of occupant occlusion and other problems, multiple photographic shots at different distances can be designed into the system as disclosed herein. This additional set of images must be taken into the account in the face detection algorithm. From the multiple image collection, a form of heuristics can be applied to select the overall image with the greatest probability of successful facial detection. Additionally, framing the photographic shots such that the windshield is centered therein can contribute to overcoming the above stated challenges as disclosed herein.

DETAILED DESCRIPTION OF EMBODIMENTS

The following description is of the best currently contemplated mode of carrying out exemplary embodiments of methods, systems and apparatus of the present disclosure. The description is not to be taken in a limiting sense, and is made merely for the purpose of illustrating the general principles of the invention.

Aspects of the present disclosure relate to recording and identifying one or more human occupants of a vehicle driven at or as it approaches a security checkpoint area, in any vehicle traffic control application, or any application required to determine the occupants within a vehicle, for example.

Figure 1:
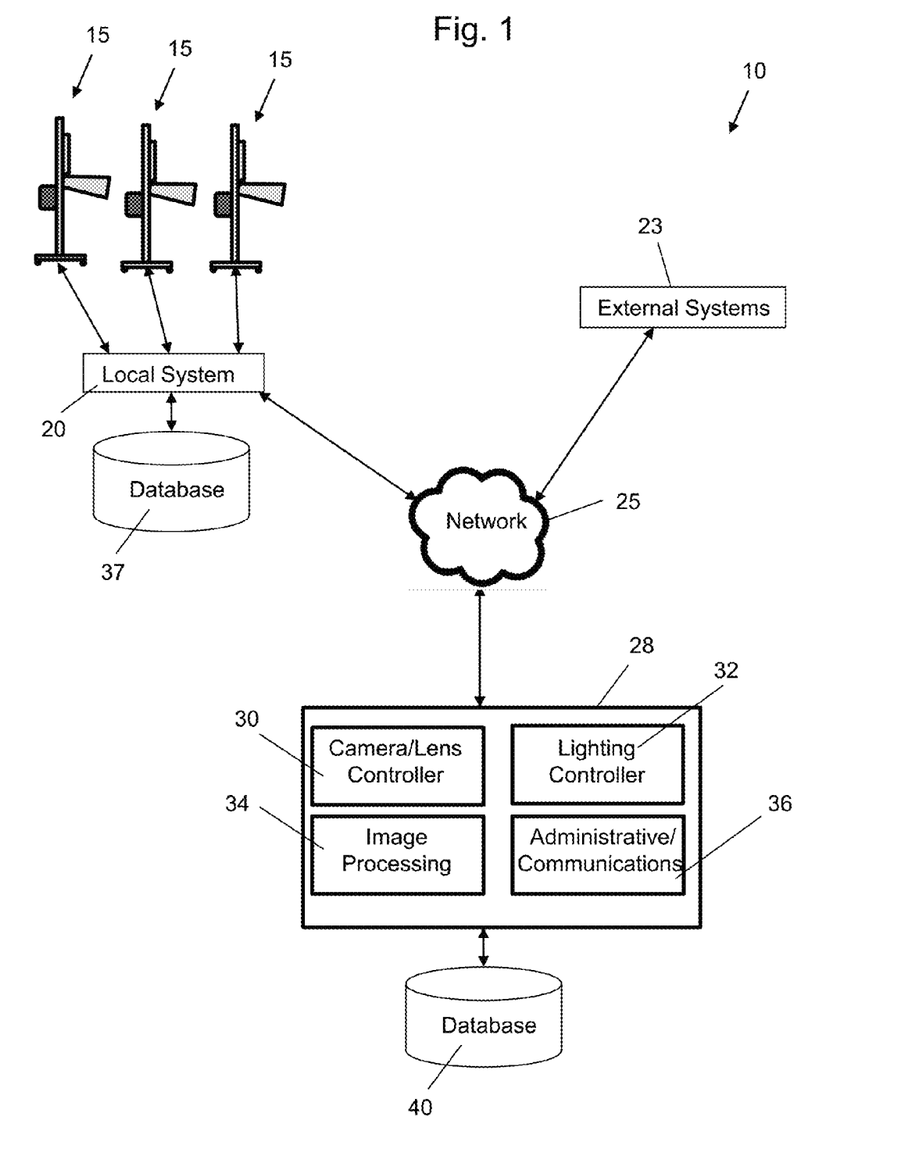
FIG. 1 is a schematic diagram illustrating an entry control system according to one embodiment of the present disclosure.
Figure 2:
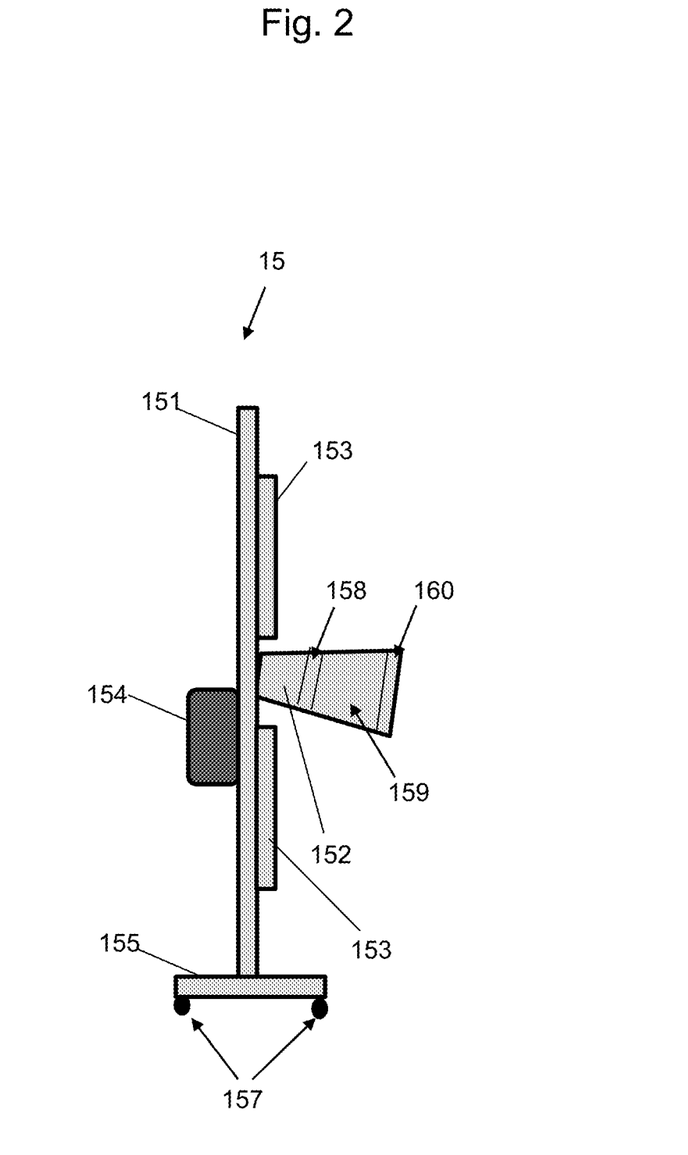
FIG. 2 is a schematic diagram illustrating an entry control system according to another embodiment of the present disclosure.

As shown in FIGS. 1 and 2, the present invention can be implemented as part of an entry control system 10, including one or more entry control devices (shown generally at 15) and a remote central system 28 including a controller accessible via a network 25, wherein system 28 can access database 40. In various embodiments, a single device 15 or group of devices 15 can include an integrated central controller as part of a local computing system 20, including a controller which can access a local database 37. The database(s) 37 and/or 40 can be used to store and update reference images and data for people and all types of vehicles. For people, reference images can be images previously obtained using the systems, devices and methods of the present disclosure, or obtained through online searches, social engineering searches, or from other sources, for example. In the instance of online and social engineering searches, images can be obtained via external systems 23 such as web sites and online services. For vehicles, reference images can be "stock" images of vehicles from various perspectives, including undercarriage images, made available by vehicle manufacturers, dealers or service providers, for example. Vehicle undercarriage inspection systems can be obtained, for example, through Gatekeeper, Inc. of Sterling, Va., USA, and such technology is described, for example, in U.S. Pat. No. 7,349,007, U.S. Pat. No. 8,305,442, U.S. Pat. No. 8,358,343, and U.S. Pat. No. 8,817,098, the disclosures of which are incorporated herein by reference in their entireties. Alternatively, reference images can be images created using the systems, devices and methods of the present disclosure. It will be appreciated that the effectiveness of embodiments of the present invention can be increased when using reference images created using the present disclosure, due to the increased accuracy, clarity and comprehensive detail available using the present disclosure.

In various embodiments as disclosed herein, an imaging system provides at least one camera device, at least one illumination device (LEDs, Lasers, etc.), at least one filter, and at least one microcontroller processing unit to execute image processing to record and identify the vehicle occupants. An exemplary apparatus diagram is pictured in FIG. 2.

As shown in FIG. 2, the device 15 can include a pole 151, camera 152 with lens, illumination device(s) 153, local computing device 154 and base 155, wherein the base 155 can be mounted on rollers, wheels or similar devices 157 that facilitate portability. In various embodiments, camera 152, illumination device 153, and computing device 154 are suitably mounted at appropriate heights and accessibility for the illumination device(s) 153 to appropriately illuminate a field of view for the camera lens, and for the camera 152 to appropriately capture images in the field of view to carry out the functions described herein. Alternatively, the device 15 can be provided without a spine and base, wherein the device and one or more of its components are mounted to fixed or mobile structures at or near the deployment area for the device. The local computing device 154 can comprise the local system 20 and database 37 of FIG. 1, in accordance with various embodiments of the present disclosure.

It will be appreciated that the camera device 152 can be a high resolution area scan camera optimized for day/night operation and optimized to create useful imagery when synchronized with an illumination source. The illumination device(s) 153 can include powerful LED arrays that are temporally synchronized with the exposure time of the camera and spectral sensitivity of the camera's imaging sensor to illuminate the inside of vehicles—even through heavily tinted windows. In various embodiments, the illumination device 153 can be a grid of illumination devices arranged above, below and to the sides of the camera device. The system and apparatus can further include an optical bandpass filter 158 to allow transmission of the light emitted by the illuminator to the camera/imaging sensor 152 while blocking all other wavelengths of light that may cause inconsistent imaging performance due to reflections, or undesirable uncontrollable lighting conditions (varying light levels day and night). The system and apparatus can further include an objective lens 159 and a linear-polarization filter 160, where the linear-polarization filter can filter out reflections on the glass through which the imaging system is acquiring images of occupants' faces. In various embodiments, as illustrated in FIG. 2, for example, the linear-polarization filter 160 is mounted at the opposite end of the camera device 152, with the bandpass filter 158 and objective lens 159 secured therebetween. The system and apparatus can also employ an image enhancement algorithm that improves the probability of successfully detecting and recognizing the faces of vehicle occupants, as described elsewhere herein.

Whether employing a local system 20 or remote central system 28, various sub-components of the system 20 or 28 provide for operation of the device 15. For instance, the camera/lens controller 30 in FIG. 1 is operable to control the camera (e.g., 152) and settings being used at a given deployment. Settings can include the zoom, focus and iris on the objective lens, for example, and establishing settings that capture the windshield centered in the frame facilitate accurate and clear image capture, as described elsewhere herein. The lighting controller 32 operates to control illumination device (e.g., 153), including, for example, adapting for daytime lighting conditions, nighttime lighting conditions, weather-related conditions, and anticipated vehicle type and/or tint type conditions, for example. The image processing component 34 operates to process images of a driver, occupant and/or contents of a vehicle as disclosed herein. The administrative/communications component 36 permits administrative users to add, change and delete authorized users, add, change and delete deployed and/or deployable equipment, establish communication protocols, communicate with vehicle occupants via a microphone or hands-free communication device in communication with a speaker on or near device 15, enable local processing functionality at local systems 20 and/or 154, and even make and adjust settings and/or setting parameters for the device 15 and its components, including camera 152, lighting device 153 and image processing device 154, for example. Component 36 also permits communications with devices 15 directly, indirectly (such as through network 25 and local system 20) and with external computing systems 23. For example, the system 10 may need to report information about specific known criminals to external systems 23 such as law enforcement or military personnel. Alternatively, the system 10 can employ external systems 23 to gather additional details such as additional images of vehicles or individuals in order to operate in accordance with the principles and objectives described herein. While FIG. 1 illustrates components 30, 32, 34 and 36 as part of remote system 28, it will be appreciated that local system 20 or 154 can also include a respective camera controller component, lighting controller component, image processing component and administrative/communications component. For example, device 15 can include one or more computer processing components, which can be embedded in the camera 152 or provided as part of local device 154, which produces a digital image that can be transmitted by public or private network to a display device, such as a local computer display, or a display associated with a remote personal computer, laptop, tablet or personal communications device, for example. At such time, the image can be viewed manually or further processed as described herein. Such further processing can include a facial image processing application, for example.

In various embodiments of the present invention, local system 20 can comprise local computing device 154 having at least one processor, memory and programming, along with a display interface. In various embodiments, local computing device can comprise, for example, an aluminum casing with an opening at the front to expose a touch screen interface, and an opening at the back to expose small plugs for network cabling, power, server connection, and auxiliary device connection, for example. The screen configuration addresses a number of issues relevant to the operation of the invention. For example, the touch screen interface is intuitive (i.e., one can see it, touch it), it is readable in daylight, and it allows operators to keep gloves on in hot and cold conditions.

It will be appreciated that display interfaces can be provided locally with the device 15 (e.g., as part of device 154), and can also be provided remotely, for example, as part of an external system 23 comprising a computing device accessing images via administrative/communications component 36. Such a computing device can be of various form factors, including desktop computers, laptops, iPad™ devices, smartphone devices and devices of other sizes. Interfaces can show various images and provide for user interaction via input devices, including touch screen interfaces, as noted in WO/2016183408A1 to Barcus et al., the disclosure of which is incorporated by reference herein in its entirety.

Embodiments thus provide an entry control system that comprises at least one camera device, at least one illumination device, and at least one controller operable to execute image processing to detect faces and identify individuals within a vehicle. The system can access a database, such as database 37 and/or 40, for example, which holds vehicle and individual details, including images, which can be categorized by at least one identifier, such as, for example, the vehicle make, model, year, license plate, license number, vehicle identification number (VIN), RFID tag, an optically scannable barcode label and/or vehicle owner information associated with a vehicle in which the occupant was identified. The computer can further include programming for comparing field image data obtained against the images in the database.

The present invention further retains both reference and archived images on either a local or central database and can access the images through a network configuration. Vehicles returning over the system at any point within the network can be compared automatically to their previous image (for example, by identifying the vehicle through a vehicle identifier such as a license plate number or RFID tag) or to a same or similar vehicle make and model image through the reference database. In various embodiments, the reference database comprises, in part, vehicle makes and models. In various embodiments, the vehicle image history can also be displayed by invoking the "history" button, at which time a calendar will be displayed, inviting the operator to pick a date to review images that are registered by date and time stamp. A search feature can further be activated through the interface screen, whereby a particular vehicle number plate can be entered and the associated vehicle's history can be displayed on the user interface, listing the date and time of all visits by that vehicle to that particular scanner or entry control point, and any images of vehicle occupants that have been historically collected. In a networked environment, the system can also show the date and time that the vehicle entered other control points within a control point network.

Numerous benefits are enjoyed that are not feasible through conventional photographic systems. For instance, embodiments may provide high quality images in any lighting and in any weather condition. Embodiments may perform image capture with minimal interference with a driver's vision. In various embodiments, the system can be configured to identify the number of vehicle occupants. Individual identification performance capabilities can include confirming a captured image, comparing a captured image with a previously obtained authentic image, and automated captured image confirmation, for example, via one or more image processing algorithms or protocols.

Embodiments of the system can include one or more occupant cameras and one or more auxiliary illumination devices. In some embodiments, an auxiliary illumination device can be associated with a single occupant camera. For example, operation of an occupant camera can be synchronized with operation of an auxiliary illumination device. A synchronized occupant camera and auxiliary illumination device can be configured to illuminate a target and capture an image according to a predetermined timing algorithm, in various embodiments of the present invention. In some embodiments, more than one occupant camera can be synchronized with an auxiliary illuminating device. For example, the relative layout of a vehicle approaching an image capture point, relative to other structures and objects, as well as to the mounting location(s) of a driver camera and an auxiliary illuminating device, as well as particular identification protocols in effect, may necessitate more than one camera viewpoint. In some embodiments, an occupant camera can be synchronized with more than one auxiliary illuminating device. For example, the relative layout of a vehicle approaching an image capture point, relative to other structures and objects, as well as to the mounting location(s) of an occupant camera and an auxiliary illuminating device, as well as particular identification protocols in effect, may necessitate more than one auxiliary illumination angle.

In a demonstrative embodiment, a camera synchronized with an auxiliary illumination device, such as an LED strobe, for example, can be configured using the camera component 30 to capture an image as a single frame. The exposure time of the camera can be set to a short duration via component 30, such as a few hundred micro-seconds, and for example, about 325 micro-seconds. Shorter durations reduce the adverse impact of ambient light, such as glare, on the image capture. In various embodiments, the synchronized LED strobe can be configured to trigger upon a signal for the camera to capture an image, and may emit auxiliary illumination for a few hundred micro-seconds, and for example, about 300 micro-seconds, using lighting component 32. In some embodiments, the camera exposure time may be slightly longer than the duration of the auxiliary illumination, such as about a few micro-seconds. The signal to capture an image can be provided manually, such as by an operator of local 20, 154 or remote 28 controller, or automatically, such as by a sensor deployed at the entry control point in communication with the local 20, 154 and/or remote 28 controller. Such a sensor can be, for example, a proximity sensor capable of determining the distance of an oncoming vehicle from the device 15, or a motion sensor capable of detecting motion of an oncoming vehicle past a specific point. Appropriate setup and calibration protocols can be employed to ensure that the sensors operate accurately and timely to ensure optimal or near-optimal image capture. In addition, the system may also be triggered via analysis of the imagery in the field of view of the camera lens. The triggering may be based on the size or location of objects of interest. For example, through constant image analysis the size and location of a vehicle, human face, and/or license plate, etc. can be measured until the feature of interest occupies the ideal location in the image or occupies the ideal field of view in the image for further image analysis. That single image or multiple images can then be forwarded to analysis algorithms for license plate detection, facial detection/identification, and other processing. In some embodiments, the capturing of images via the camera is triggered once a vehicle windshield is within the camera's field of view, or once at least a portion of a vehicle occupant is within the camera's field of view.

In a demonstrative embodiment, a camera synchronized with an auxiliary illumination device, such as an LED strobe, for example, can include a light filter to reduce the wavelengths of light captured. For example, the camera can include a band pass filter 158 or other filter that allows light in a narrow portion of the visible spectrum to pass through the filter, such as about 625 nm, in the red color range. The auxiliary illumination device can also be configured to emit light in the same or similar wavelengths. Light frequency matching in this manner reduces the adverse impact of ambient light on the image capture.

An auxiliary illumination device, such as an LED strobe 153, for example, can be configured to emit a substantial intensity of light. The substantial intensity of light may be sufficient to penetrate most window tints, and provide sufficient light for the image capture to clearly identify objects in the interior of a vehicle having a tinted window.

In various embodiments, local system 20, 154 or remote central system 28 can be used to operate one or more components and features as described elsewhere herein. For instance, camera controller component 30 can be employed to trigger an image capture and otherwise operate an occupant camera (e.g., 152), and lighting controller component 32 can be employed to control auxiliary illuminating device (e.g., 153). Further, image processing component 34 can be employed to compare a captured image with an authenticated and/or previously stored image. It should be appreciated that a computer system such as system 20, 154 or remote central system 28 can be configured to operate one or more user interfaces to operate one or more aspects of the systems. Further, the controller can be configured to perform numerous algorithms for operating one or more aspects of the system, in addition to image capture and comparison algorithms, for instance. In some embodiments, a computer system may be integrated with a camera and/or an auxiliary illumination device.

As shown in FIG. 1, embodiments can be integrated with a computer network 25. For example, some embodiments can be connected to a network 25, and exchange information with other systems. Information can include captured images, authenticated images from a database and additional information to confirm an identity, for example. Embodiments can be provided with various power supply sources. In some embodiments, components can be provided with one or more dedicated power supply sources. For example, a camera can have an onboard battery, and an auxiliary illumination device may draw power from a capacitor bank. Some embodiments of the device 15 and/or system 20 can receive power from local power sources and/or networks, such as, for example, a distributed low voltage power cable. Some embodiments can be configured for Power over Ethernet, and receive power through Ethernet cabling.

In some embodiments of a system for enhanced visual inspection, one or more physical components can be configured for equipment ratings at IP65 or higher. As is known in the art, an IP (ingress protection) rating of 65 generally means that the component is completely protected from dust, and that the component is protected against water ingress from wind driven rain or spray. Some embodiments can include more than one camera, and other embodiments can be configured to provide more than one camera mounting position and configuration.

Embodiments can be configured for one or more mounting options, including self-mounting, structure-mounting, fence-mounting, and the like. For example, some embodiments can be configured for mounting on an existing structure, such as a standing pole, fence, facility wall, and the like. Some embodiments can be configured for overhead mounting on an existing structure, such as a rooftop application. In some embodiments, components can be configured to move, such as through panning, tilting and zooming. For example, a camera and an LED light array can be mounted with one or more degrees of freedom. Some embodiments can allow manual movement of one or more components, and in some embodiments, movement can be through electro-mechanical elements. Movement of a component can be controlled from a control station in some embodiments, and/or via administrative component 36 or camera component 30, for example. It should be appreciated that numerous mounting options and movement options can be provided without departing from the principles disclosed herein.

One exemplary embodiment includes a high resolution Gigabit Ethernet (GigE) area scan camera (e.g., 152), a bandpass filter 158, an objective lens 159, a linear-polarization filter 160, a high-powered LED strobe light (e.g., 153), and a computer system (e.g., 154) configured for advanced image processing via component, such as component 34. The area scan camera can transfer data at rates up to around 1,000 Mb/s, and can be configured for daytime and nighttime operation. The LED strobe light can be synchronized with the area scan camera to provide auxiliary illumination. For example, auxiliary illumination can be provided in generally the same direction as the camera image capture, at generally the same moment as the image capture, and/or in similar light frequencies. The computer system and/or the camera's embedded computing unit can be configured to run one or more algorithms to detect and highlight individuals inside a vehicle, and/or reduce or remove the impact of ambient light glares.

In some embodiments, device 15 includes a camera and an auxiliary illumination device in a common housing, as shown in FIG. 2. Those components can be connected to a computer system (e.g., 20, 154 or 28) through cabling or wireless connections. Power can be received from an external power supply source, and some embodiments may include one or more onboard power supplies.

Figure 12:
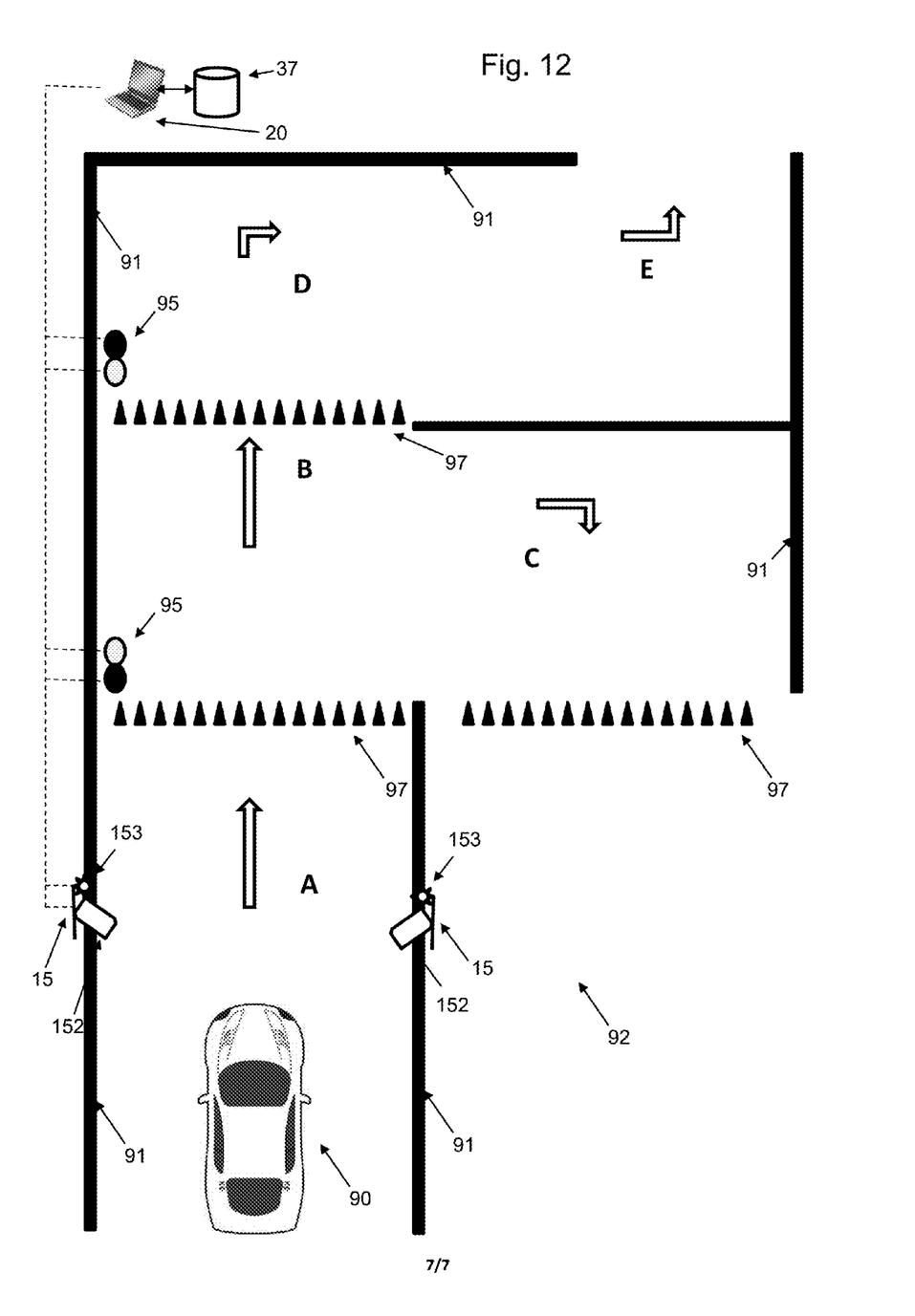
FIG. 12 is an exemplary schematic layout of an entry control system in accordance with one aspect of the present disclosure.

In some embodiments, a system can include one or more cameras, and one or more auxiliary illumination devices, in a common area. The camera(s) and auxiliary illumination device(s) can be configured for viewing an approaching vehicle from one or more viewpoints (e.g., direction, height, angle, etc.). For example, a facility gateway 92 can include multiple devices 15 as shown in FIG. 12, distributed on opposite sides of the gateway 92. In this example, multiple images of an approaching vehicle 90 can be captured for analysis. Captured images can be transmitted to one or more computer systems 20 configured to operate one or more identification protocols, wherein the computer system(s) 20 can access database 37, for example. In one embodiment, communications from the camera can be communicated to system 20 either by CAT5E/CAT6 (Ethernet) cabling, or by ruggedized fiber optics cable ((multi-mode or single mode), for example. Some embodiments can further include an under vehicle inspection system, such as referenced above. For instance, images and other scans of the underside of a vehicle can be captured for analysis. The analysis may be conducted during the visual inspection. Some embodiments can include multiple data storage options, such as, for example, local or remote database servers, single or redundant servers and/or PSIM integration.

In some embodiments, a method for visually inspecting a vehicle includes capturing one or more high-resolution images of vehicle occupants. An auxiliary illumination device provides synchronized light, to improve clarity of the captured image(s). The captured image(s) may be displayed to access control personnel, such as at an operator terminal in communication with the camera. Access control personnel can view the displayed image(s) to see inside the vehicle, for example, to confirm the number of occupants and identify one or more occupants, for example. In this manner, access control personnel can visually inspect the interior of a vehicle in a range of lighting and viewing conditions.

In various embodiments, a computer system and/or the camera's embedded computing unit can be included and configured to perform advanced image processing.

Advanced image processing can include various color and contrast adjustments to improve image clarity. Appropriate color and contrast adjustments can depend on the ambient light, and therefore may vary during daytime and nighttime image capture, as well as during various weather conditions. Various color and contrast adjustments can be performed using image processing component 34, for example. For example, gamma correction can be used to enhance the brightness of an image reproduced on a monitor or display. As another example, contrast stretching can be used to improve the intensity of color variations in an image, thereby enhancing the fine details in a captured image. Other known techniques may be used to enhance an image, such as techniques for reducing image blur and ghosting, and for image sharpening, for example.

Embodiments can be deployed in numerous settings, such as, for example, ingress and egress lanes, inside complexes and large facilities, border crossings, secure parking facilities. Demonstrative parameters for one embodiment are as follows:
Camera Type: GigE Machine Vision camera—Monochrome
Sensor: CMOS Image Sensor—Optimized to illumination source
Resolution: 1600×1200 (2 MP)
Frame Rate: 60 fps
Lens: 25 mm, 2 MP, Low-distortion, Optimized to illumination source
Filter: Matching Illumination wavelength Band Pass
Protocol: TCP/IP
Illumination Device: LED strobe array—field view—programmable
Power: 24 VDC LED Array
Dimensions: Including sunshield 400 mm×150 mm×265 mm
Weight: Camera: 1.2 kg
Conformity: CE, FCC, RoHS
Enclosure: IP65 rated
Environmental: −35 C—+60 C
Window Tint: >35% VLT
Linear-Polarization Filter: Extinction Ratio 9000:1, Wavelength Range 400-700 nm
Face Detection Detecting human faces in an unconstrained image is a challenging process. It is very difficult to locate the positions of faces in an image accurately. There are several variables that affect the detection performance, including wearing of glasses, different skin coloring, gender, facial hair, and facial expressions, for example. Furthermore, the human face is a three-dimensional (3-D) object, and might be captured under a distorted perspective, with multiple illuminations or in a partially occluded manner. As a result, a true face may not be detected.

In various embodiments, a computer vision and machine learning software library, such as OpenCV (Open Source Computer Vision), for example, is used to operate a suitable facial detection algorithm in accordance with the present disclosure. OpenCV is a library of programming functions mainly aimed at real-time computer vision, and OpenCV can implement various algorithms including the Viola and Jones Face detector, which is a known method for real-time object detection based on machine learning techniques. With regard to face detection, two classes of images are defined, i.e., faces and non-faces. A machine-learning algorithm such as AdaBoost can be used to compute a set of Haar-like features which results in good classifiers. Finally, the yielded classifiers are appropriately merged in a cascade.

Figure 3:
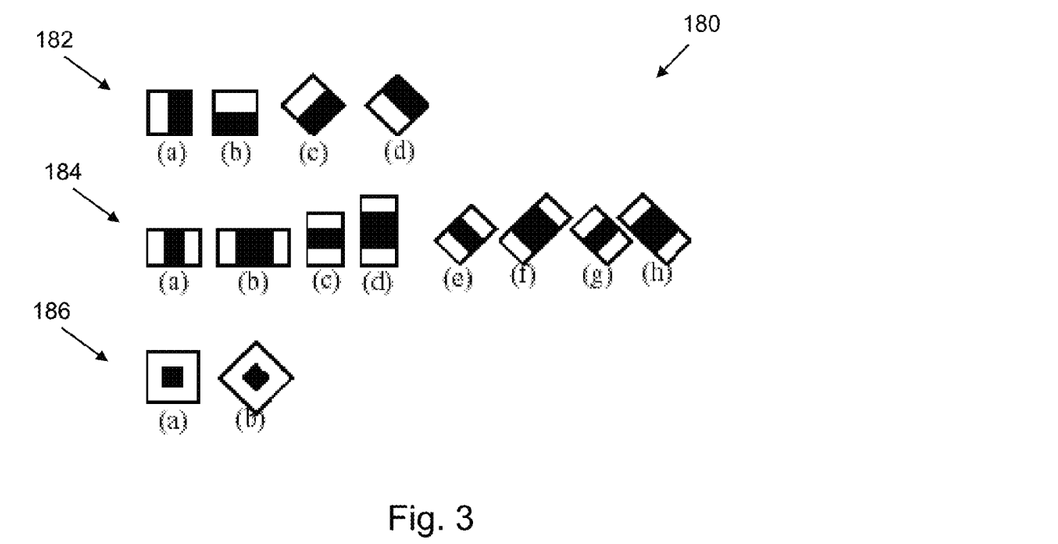
FIG. 3 shows images associated with Haar-features as employed in accordance with aspects of the present disclosure.

A simple rectangular Haar-like feature can be defined as the difference of the sum of pixels of areas inside the rectangle, which can be at any position and scale within the original image. The values indicate certain characteristics of a particular area of the image. Each feature type can indicate the existence (or absence) of certain characteristics in the image, such as edges or changes in texture. FIG. 3 is a diagram 180 showing the Haar-features implemented in the Viola-Jones OpenCV algorithm employed in accordance with various embodiments of the present disclosure. These edge 182, line 184, and center-surround 186 features detect and indicate borders between darker and lighter regions of the image.

Figure 4:
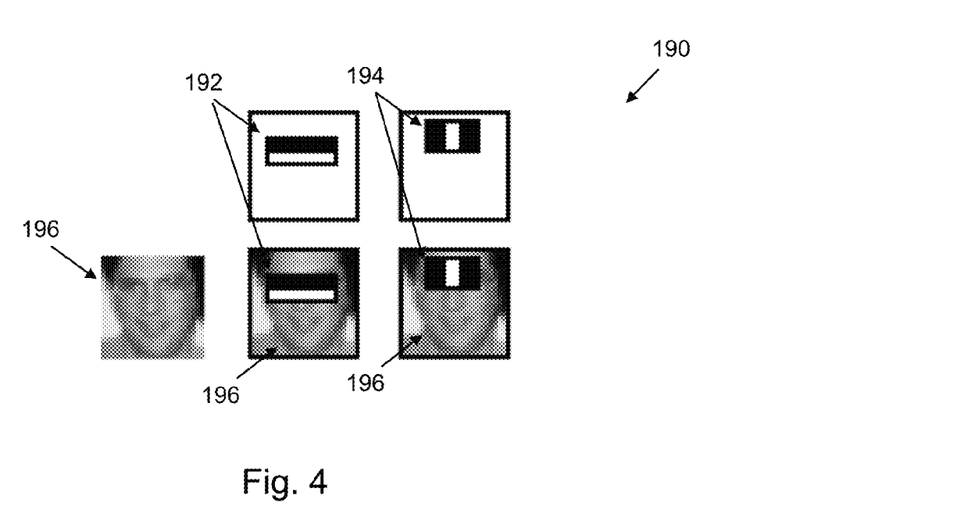
FIG. 4 shows images associated with Haar-features as employed with face detection in accordance with aspects of the present disclosure.

FIG. 4 is a diagram 190 showing Haar-features overlaid on top of a face image 196. The edge 192 and line 194 features are shown. The edge feature 192 measures the difference in intensity between the region of the eyes and the region of the upper cheeks. The line feature 194 does the same for the eyes region and the cheeks. These classifiers are then combined in a cascade as pictured in the diagram 200 of FIG. 5. A rejection cascade is used by the Viola-Jones classifier where each node represents a boosted classifier tuned to not miss a true face while rejecting non-faces. For example, as shown in the diagram 200 of FIG. 5, the system operates suitable programming to perform the identified functions, including receiving all images as overlapping sub-windows as at step 201. The system then evaluates the images at a classifier level to detect face and non-face sub-windows as at step 203, and eliminates any non-face objects at step 205. The system then assesses whether evaluation is complete at step 207. If further evaluation is needed, the system returns to the next classifier level evaluation at step 203, and if the images have otherwise been processed to remove non-face objects, the system forwards the true face sub-windows for further processing as described herein.

Figure 5:
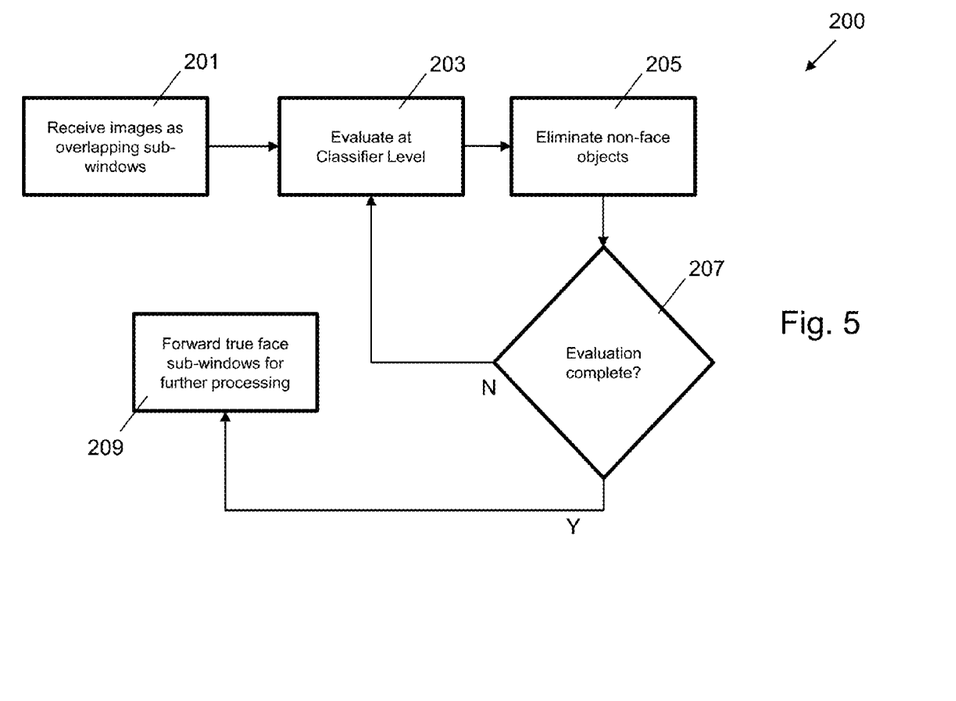
FIG. 5 shows a schematic description of a cascade in accordance with face detection associated with the present disclosure.

In various embodiments, the evaluation step 203 employs the OpenCV™ implementation, which uses the following C++ application programming interface (API) to implement the Viola-Jones algorithm classification.

C++: void CascadeClassifier::detectMultiScale(const Mat& image, vector<Rect>& objects, double scaleFactor=1.1, int minNeighbors=3, int flags=0, Size minSize=Size( ), Size maxSize=Size( ))

This API detects objects of different sizes in the input image. The detected objects are returned as a list of rectangles. The first input, image, is a gray scale image. The scaleFactor parameter determines how big of a jump there is between in each scale. Setting scaleFactor to high is a tradeoff of fast computation for possibly missing faces at one particular scale. The minNeighbors parameter controls false detection. In general, a face occurs in multiple overlapping sub-windows. If this parameter is too low, the algorithm may yield multiple false positives. If it is too high, the number of overlapping windows may be too restrictive. Two other key parameters are minSize and maxSize. They are the smallest and largest regions in which to search a face.

As previously described, sometimes faces in a vehicle can be occluded for several different reasons. In order to minimize this effect, it is valuable to image acquire the vehicle at different positions in time. In various embodiments, this involves multiple calls of a detectMultiScale( ) function with different images (captured at different distances).

Additionally, in this embodiment, the probability of successful vehicle occupant identification is maximized when vehicle images are captured with the windshield of the vehicle centered as the primary object in full view of the captured image frame. This can also be referred to as maximizing the trapezoidal frame of the windshield to fill the field of view (FoV) of the camera's optics. This maximization can be achieved by triggering the camera's image acquisition either via a variety of triggering methods, including: mechanical triggering such as inductive ground loop sensors, optical cut signal triggering, or through object tracking or optical flow algorithmic image analysis methods. In this regard, it will be appreciated that the windshield and any other window in the field of view will have a window frame. For example, the roof, hood and side frames of the vehicle form a "frame" for the front windshield of a vehicle. When this window frame is fully captured by the camera of the present system, the chances of successful facial detection are maximized.

For example, if two shots are captured from the same camera of the same vehicle, the detectMultiScale( ) function is called two times. If for example, detectMultiScale_1( ) for the closest distance, does not detect a face, the system executes detectMultiScale_2( ) for the farthest distance, in an effort to provide better information about the vehicle occupants in the second image. It will be appreciated that the parameter list for detectMultiScale_1( ) and detectMultiScale_2( ) will necessarily be different, especially minSize and maxSize.

In order to adjust minSize and maxSize for multiple shots, the system can take into account their relationship as a simple inverse, i.e. object size in image=objectsize*focal length/object distance from camera. If the same object and the same focal length are kept, then size=1/distance. Thus, for distant shots, embodiments of the present disclosure operate to scale down minSize and maxSize according to the 1/distance rule.

Polarizing Filters, Spectral Filtration, and Pulsed Illumination

Imaging through a transparent medium such as a glass windshield has many challenges. One major challenge is that glass can often produce significant reflections obscuring the objects behind the glass. Nevertheless, at a very specific angle called the Brewster's Angle, the reflected light becomes perfectly linearly-polarized. The reflected light is also partially linearly-polarized at angles near the Brewster's Angle. As shown in the graph 88 in FIG. 6, the resultant linear polarization of reflected light at the Brewster's Angle is shown. Ray 89 represents the unpolarized incident ray, ray 90 represents the polarized reflected ray, and ray 91 represents the slightly polarized refracted ray.

Figure 7:
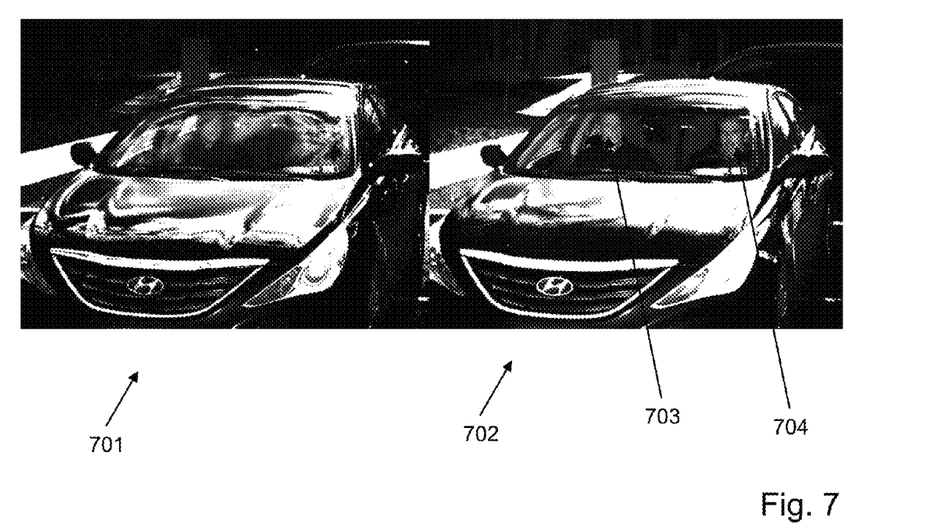
FIGS. 7 through 11 are example images associated with embodiments of the present disclosure.

In accordance with various embodiments of the present disclosure, a linear-polarization filter is secured to the camera device 152 in the imaging setup and oriented to reject light with the polarization due to reflection off of glass, and transmit light of any other polarization. The result is a significant reduction in the transmission of the glass-reflected light through the camera/imaging system, allowing the acquisition of objects behind the windshield glass that were previously obscured by foreground reflections. For example, image 701 in FIG. 7 shows an image captured without the filter and image 702 in FIG. 7 shows an image captured with the linear polarization filter, wherein facial images 703, 704 of the vehicle occupants are much more readily observable. According to these embodiments, the specular reflections of clouds off the windshield become linearly-polarized and filtered out via the linear-polarization filter in the image on the right, allowing for successful imaging of the occupants. Thus, even though the system can operate by obtaining images with the windshield as the primary object in the field of view, the linear polarization filter assists in mitigating the transmission of the reflected light from the windshield back to the camera device, enabling better image capture.

In various embodiments, spectral filtration can also be used to reduce the impact of uncontrollable light sources (ambient light) on the imagery. For example, an optical bandpass filter implemented near the camera sensor is designed to allow the wavelengths of light emitted by the illuminator to pass while rejecting all other wavelengths. This significantly increases the impact that the illuminator has on the imagery produced by the system and allows the photons emitted from the illuminator to dominate all other illumination sources in most conditions. The result is repeatable, consistent imagery day or night. In various embodiments, the disclosed system implements a bandpass filter of 70 nm FWHM centered at 635 nm and an LED illuminator emitting at 635 nm with a bandwidth less than 70 nm. Other implementations may include a filter/illuminator/sensor combination ranging from 300 nm up to 3000 nm in wavelength, for example.

Figure 8:
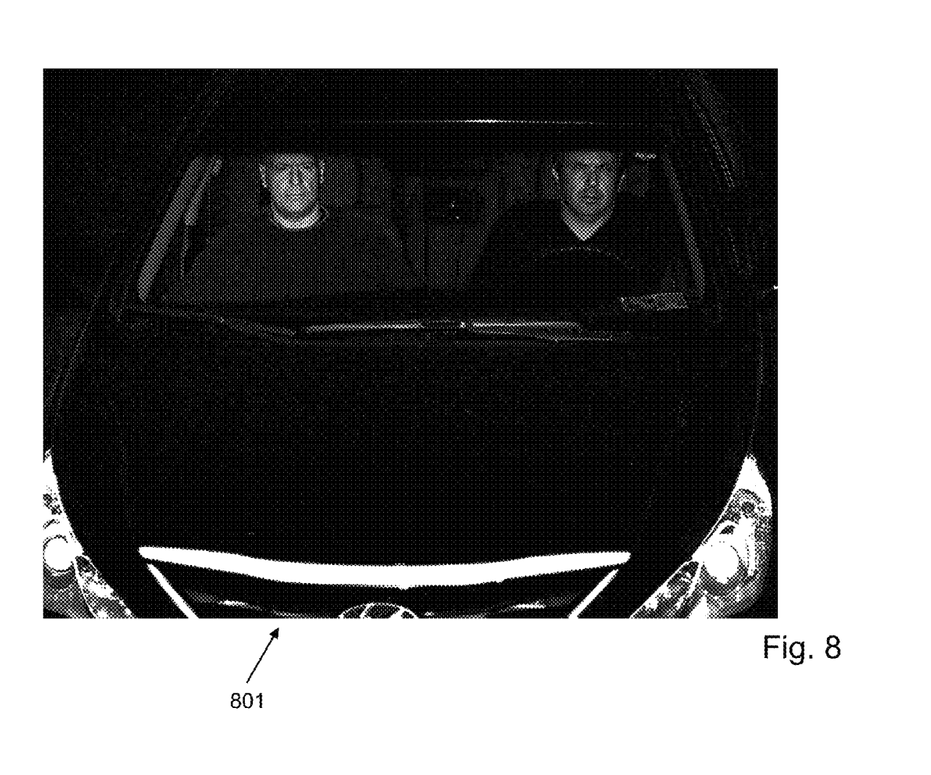

In various embodiments of the system and apparatus of the present disclosure, pulsed illumination is used to further reduce the impact of ambient light. A high intensity LED pulse is triggered based on the active exposure time of the camera. The duration of the LED pulse is matched with the duration of the exposure time to maximize the impact of LED photons on the imagery while reducing the impact of ambient photons. For example, the pulse width and exposure time can be set to 150 microseconds. Other pulsewidths and exposure times can be used for similar effect. The result of combining the techniques of spectral filtration and pulsed illumination are shown by the exemplary image 801 captured in FIG. 8. As will be appreciated, image 801 is dominated by the LED illumination emitted toward the faces of the occupants, and ambient solar radiation is significantly less impactful than the LED illumination.

Image Enhancements

Figure 9:
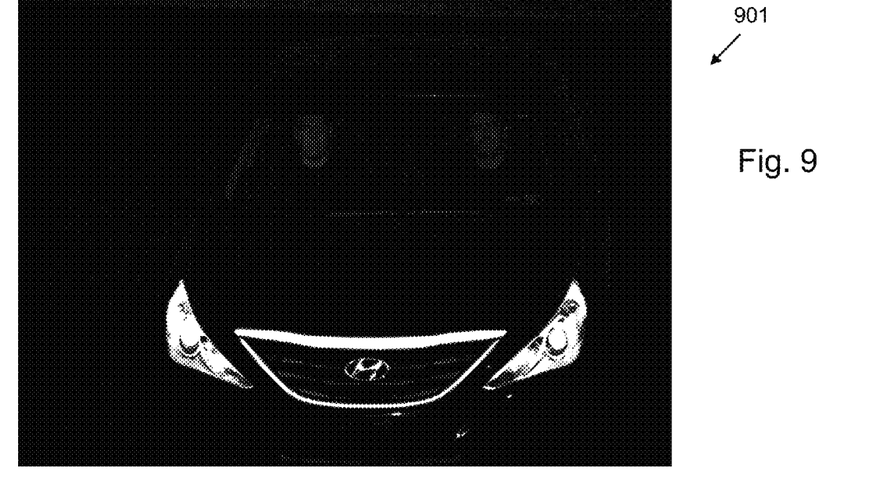
Figure 10:
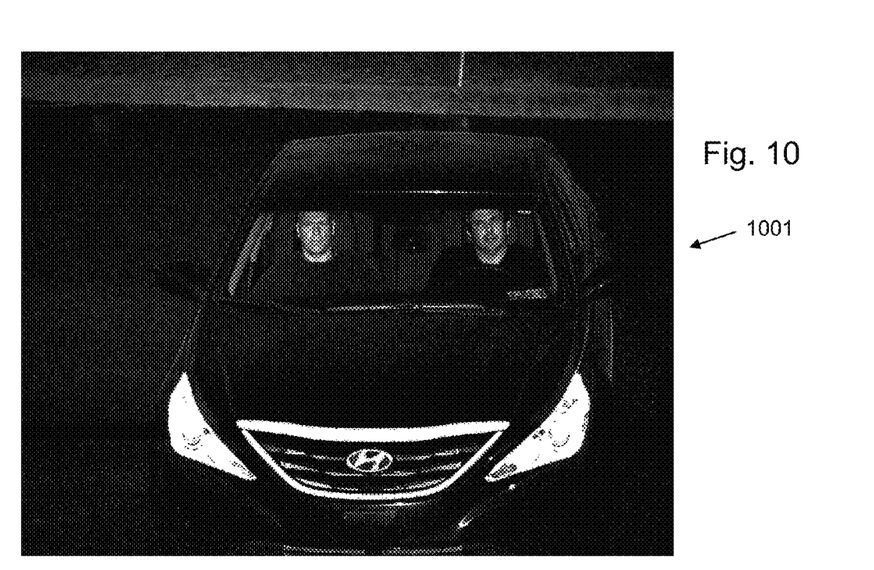
Figure 11:
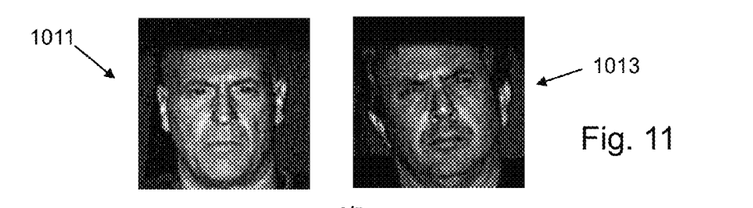

Image enhancements improve the performance of the facial detection algorithm in accordance with the present disclosure. Since the imagery obtained by the system is dominated by the LED illumination, as noted above, the brightness of the imagery decreases with increased distance to the objects or occupants being imaged. Very dark imagery can be produced, reducing the effectiveness of the facial detection algorithm. For example, the image 901 in FIG. 9 is taken at a range too distant to create enough signal for a successful face detection via the face detection algorithm in accordance with the present disclosure. Techniques such as contrast stretching, histogram equalization, or local area processing, can improve the performance of the facial detection algorithm. FIG. 10 shows an image 1001 corresponding to image 901 in FIG. 9, wherein the image is enhanced using a contrast stretching enhancement algorithm. The result is a much clearer picture of the vehicle occupants as well as a successful face detection for each occupant, shown at 1011 and 1013 in FIG. 11 as cropped images produced by the face detection algorithm in accordance with the present disclosure.

Operations

In installation of the present invention, calibration programming can be provided for calibrating the camera in combination with the illumination device described. By calibrating the camera with the illumination device, the reliability and detail of the captured images are significantly improved. The camera 152 can further be setup with an optical bandpass filter 158, objective lens 169 and linear-polarization filter 160, as shown in FIG. 2. Once the system has been successfully set up, it is ready to record images.

Figure 6:
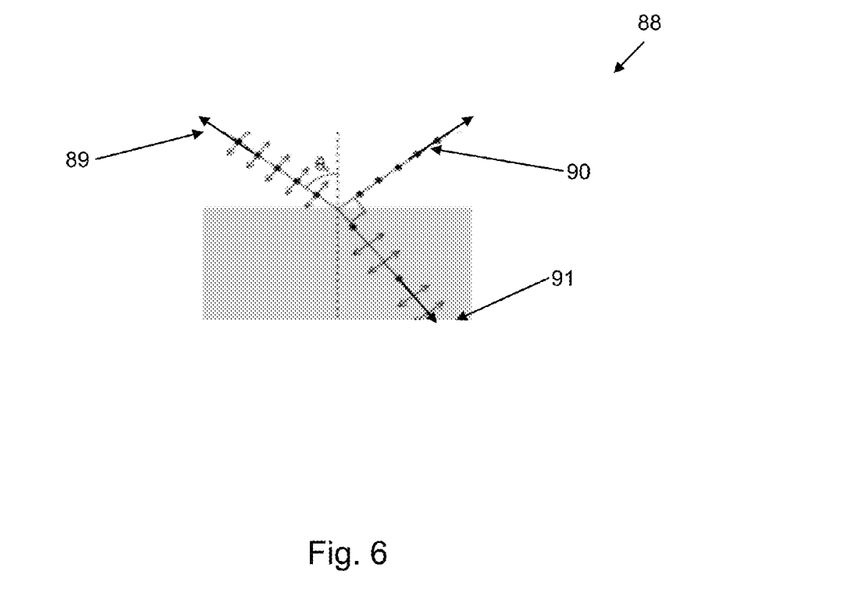
FIG. 6 is a depiction of a resultant linear polarization of reflected light at the Brewster's Angle in accordance with the present disclosure.

As shown in FIG. 6, an oncoming vehicle 90 to a gateway 92 can be discovered, for example, as it crosses a motion sensor or is detected via a proximity sensor, for example. A set of barrier walls 91 can be placed to channel vehicle traffic into and/or over the entry control point system of the present invention and its components. At such time, a vehicle identifier associated with the vehicle can be discovered, such as by capturing an image of a license plate, detecting an RFID tag, an optically scanned barcode label or other electronically detectable tag, for example. One or more stoplights 95 can be provided to manage the speed of the oncoming vehicle, and the determination process for whether to allow the vehicle to proceed past the barrier (e.g., one-way spikes 97) can proceed as described elsewhere herein. For instance, upon detecting the vehicle, the system can operate such that the camera 152 of device 15 captures an image in synchronization with illumination device 153, such that the captured image depicts the individual(s) within the vehicle with sufficient clarity. The illumination device effectively lights up the vehicle interior, even after the lighting effect travels through a tinted window, to provide highly effective lighting to support effective image capture via the camera. The employment of the camera, illumination device and image processing produces high quality images in all lighting and weather conditions. Further, the image capture does not interfere with or otherwise impair the driver's ability to safely operate the vehicle. The system can identify the number of occupants, and individual occupants can be identified manually or automatically.

The system can then retrieve any available archived images of individuals associated with the vehicle based on the vehicle identifier to determine if the currently captured image depicts the same individual(s) as is/are depicted in any archive images. If, for example, the individual is identified as requiring a denial of entry at point A or point B as shown in FIG. 12, then the vehicle 90 can be directed to exit the entry control point as at C, without gaining entry to the facility. In various embodiments, lights 95 can be controlled by a user operating a user interface. If the vehicle occupant or occupants are considered worthy of access to the facility or other access-controlled asset through the entry point, the vehicle can be approved to move through points D and E.

Embodiments of the system can also be used to initiate collection and storage of reference images in the database for a given vehicle and occupant(s). In various such embodiments, the system stores information regarding the vehicle's make, model, year and transmission type (e.g., standard (i.e., manual) or automatic), one or more vehicle identifiers, and one or more occupant photographs taken by the camera(s). It will be appreciated that the camera and illumination devices of the present invention allow the system of the present invention to collect and store high resolution images of vehicle occupants. Prior to the storing of collected reference images, the system of the present invention contains programming, such as image processing component 34, which allows a user monitoring the data collection to appropriately trim, crop or otherwise edit and manipulate images.

It will be appreciated that aspects of the present disclosure invoke multiple security technologies operating as a group to detect, identify, verify, search and authenticate vehicles and occupants entering a secure facility or crossing a secure boundary. In various embodiments, as a vehicle is detected, an undercarriage image of the vehicle can be captured according to the vehicle inspection systems referenced above. Currently captured undercarriage images can be compared by system 20, 154 or 28 with one or more archived images stored in database 37 or 40, any differences between the images can be noted, and a notice can be issued via administrative/communications component 36 to appropriate personnel for action. For instance, the notice can be a visual and/or audible alarm, which can be invoked at the entry control point (e.g., point A in FIG. 12) or at a separate location via external device 23 in FIG. 1. The currently captured undercarriage image can also be archived in the database. With regard to the captured image(s) of the vehicle occupant, such image(s) can be compared with one or more archived images using component 36, and appropriate personnel can assess through manual analysis as to how well the compared images represent the same person. In various embodiments in coordination with the manual assessment, the system can employ facial recognition software to analyze and display results of an automatic comparison of the present image and the archived image. Further, appropriate personnel can be notified via component 36 of a confidence calculation generated by the facial recognition software or component 36 upon the present and archived images being compared. Appropriate notifications and/or alarms as noted above can then be issued depending upon the results and their interpretation.

It will be appreciated that the database of the present invention can be of significant size to support the largest possible operations. A given vehicle's history can also be available for retrieval on demand, including profile information, image information and traffic history. In one embodiment of the present invention, an operator can place a vehicle or an individual on a watch list, such that when that vehicle or individual is detected, an alert is signaled and appropriately communicated.

An operator using the interface described above can thus verify whether an occupant and their vehicle are authorized to enter a facility, inspect the inside of a vehicle in much greater detail, verify the make and model of a vehicle against an authorized vehicle description, communicate with the driver/passenger via a hands free communication device, and control the various other devices such as the auto spikes 97, traffic lights 95, and communications to other sources 23, for example. Additionally, the operator can automatically record all vehicle and driver/passenger activity, place vehicles, drivers and passengers on watch lists and set up monitoring reports and alerts. In this way, embodiments of the present invention can be employed with vehicle access control, vehicle movement monitoring, border crossings and secure parking facilities, among other things. All data/images are entered into a database that allows all types of database analysis techniques to be employed to study historical patterns of entrants or even traffic loads for staffing of security personnel.

In various embodiments, facial recognition programming is provided as part of the image processing component 34 to facilitate the identification of individual occupants and/or the comparison of newly captured images with previously captured images. In various embodiments, facial recognition programming can comprise open source software for face detection such as OpenCV™ and commercial software products for facial recognition, such as VeriLook™ by Neurotechnology of Vilnius, Lithuania, FaceVACS™ by Cognitec of Dresden, Germany, and NeoFace™ by NEC Australia Pty Ltd. of Docklands, Victoria, Australia.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise stated, devices or components of the present invention that are in communication with each other do not need to be in continuous communication with each other. Further, devices or components in communication with other devices or components can communicate directly or indirectly through one or more intermediate devices, components or other intermediaries. Further, descriptions of embodiments of the present invention herein wherein several devices and/or components are described as being in communication with one another do not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, a processor (e.g., a microprocessor or controller device) receives instructions from a memory or like storage device that contains and/or stores the instructions, and the processor executes those instructions, thereby performing a process defined by those instructions. Further, programs that implement such methods and algorithms can be stored and transmitted using a variety of known media.

Common forms of computer-readable media that may be used in the performance of the present invention include, but are not limited to, floppy disks, flexible disks, hard disks, magnetic tape, any other magnetic medium, CD-ROMs, DVDs, any other optical medium, punch cards, paper tape, any other physical medium with patterns of holes, RAM, PROM, EPROM, FLASH-EEPROM, any other memory chip or cartridge, or any other medium from which a computer can read. The term "computer-readable medium" when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, optical or magnetic disks and other persistent memory. Volatile media can include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP), Wi-Fi, Bluetooth, GSM, CDMA, EDGE and EVDO.

Where databases are described in the present disclosure, it should be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art.

It will be apparent to one skilled in the art that any computer system that includes suitable programming means for operating in accordance with the disclosed methods also falls well within the scope of the present disclosure. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, with programmed steps of the method of the invention for execution by a processing unit. Aspects of the present invention may be embodied in a computer program product, such as a diskette or other recording medium, for use with any suitable data processing system. The present invention can further run on a variety of platforms, including Microsoft Windows™, Linux™, MacOS™, IOS™, Android™, Sun Solaris™, HP/UX™, IBM AIX™ and Java compliant platforms, for example. Appropriate hardware, software and programming for carrying out computer instructions between the different elements and components of the present invention are provided.

The present disclosure describes embodiments of the present approach, and these embodiments are presented for illustrative purposes only. These embodiments are described in sufficient detail to enable those skilled in the art to practice the present approach, and it will be appreciated that other embodiments may be employed and that structural, logical, software, electrical and other changes may be made without departing from the scope or spirit of the present invention. Accordingly, those skilled in the art will recognize that the present approach may be practiced with various modifications and alterations. Although particular features of the present approach can be described with reference to one or more particular embodiments that form a part of the present disclosure, and in which are shown, by way of illustration, specific embodiments of the present approach, it will be appreciated that such features are not limited to usage in the one or more particular embodiments or figures with reference to which they are described. The present disclosure is thus neither a literal description of all embodiments nor a listing of features that must be present in all embodiments.

The present approach may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A method for detecting a vehicle occupant, comprising the steps of: providing an apparatus comprising a camera and an illumination device, wherein the camera comprises a linear polarization filter secured adjacent a camera lens, wherein the camera lens has a fixed field of view;
   detecting the presence of an oncoming vehicle, wherein the vehicle includes at least one vehicle window separating a vehicle interior enclosure from an external environment, wherein the at least one vehicle window has a frame surrounding the at least one vehicle window;
   triggering the automatic capture of a plurality of current facial images of at least one vehicle occupant present within the vehicle interior enclosure when the at least one vehicle window frame is maximized in the fixed field of view, wherein each of the plurality of current facial images is captured automatically via the camera through the linear polarization filter, and wherein each of the plurality of current facial images is further captured from a different distance to the oncoming vehicle;
   obtaining, by a processing unit, at least one archived image of at least one individual;
   comparing, by the processing unit, at least one of the current facial images with the at least one archived image; and
   determining whether the at least one vehicle occupant and the at least one individual are the same.

2. The method of claim 1, wherein the step of comparing at least one of the current facial images with the at least one archived image is performed by the processing unit using facial recognition programming.

3. The method of claim 1, wherein the step of comparing at least one of the current facial images with the at least one archived image comprises determining, by the processing unit, whether the at least one vehicle occupant in the at least one of the current facial images is the same individual as the at least one individual from the at least one archived image.

4. The method of claim 1, further including the step of activating the illumination device when capturing each of the plurality of current facial images, and sequencing the activating and capturing steps according to an image processing protocol that specifies the relative timing of the activating and capturing steps.

5. The method of claim 1, wherein the camera lens has a field of view, wherein the at least one window frame is a trapezoidal frame of a front windshield of the oncoming vehicle.

6. The method of claim 1, wherein the step of triggering the automatic capture is further performed when at least a portion of the at least one vehicle occupant is in the field of view.

7. The method of claim 1, wherein the camera further comprises an optical bandpass filter, and wherein capturing the plurality of current facial images is performed by the camera through the optical bandpass filter.

8. The method of claim 7, further including an objective lens secured to the camera between the optical bandpass filter and the linear-polarization filter.

9. The method of claim 1, wherein the camera and the illumination device are located in the external environment.

10. The method of claim 1, wherein the step of triggering the automatic capture is performed through optical flow algorithmic image analysis.

11. The method of claim 1, including the step of authenticating the at least one vehicle occupant for access to an access-controlled asset based upon the step of comparing, and further based upon one or more of: a detected license plate number, an undervehicle image, and a readable tag on the vehicle.

12. A method, comprising the steps of: providing a camera having a lens facing a fixed field of view, a linear polarization filter secured adjacent the lens and an optical bandpass filter secured adjacent the lens; providing an illumination device for illuminating the field of view;
   providing an image processing component for synchronizing the activation of the illumination device with activation of the camera;
   detecting the presence of an oncoming vehicle, wherein the vehicle includes at least one front windshield separating a vehicle interior enclosure from an external environment, wherein the at least one front windshield has a frame surrounding the at least one front windshield;
   upon the oncoming vehicle entering the field of view and the at least one front windshield frame being maximized in the fixed field of view, activating the illumination device while capturing, via the camera through the linear polarization filter, the optical bandpass filter and the at least one window, a plurality of current facial images of at least one vehicle occupant present within the vehicle interior enclosure, wherein each of the plurality of current facial images is captured from a different distance to the oncoming vehicle;
   obtaining, by a processing unit, at least one archived image of at least one individual previously associated with the detected vehicle identifier;
   comparing, by the processing unit, the at least one present image with the at least one archived image; and
   determining whether the at least one vehicle occupant and the at least one individual are the same.

13. The method of claim 12, wherein the camera and the illumination device are located in the external environment.

14. The method of claim 12, including the step of determining, by the processing unit, the number of vehicle occupants in the vehicle interior enclosure based upon the captured plurality of current facial images.

15. The method of claim 12, including the step of authenticating the at least one vehicle occupant for access to an access-controlled asset based upon the step of comparing, and further based upon one or more of: a detected license plate number, an undervehicle image, and a readable tag on the vehicle.

16. The method of claim 12, wherein the at least one window has a frame, and wherein the step of capturing the plurality of current facial images is performed while the frame of the at least one window is within the field of view.

17. A system for detecting a vehicle occupant, comprising:

a camera comprising a linear polarization filter secured adjacent a camera lens, and a lens facing a fixed field of view;

at least one illumination device;

at least one processor; and at least one memory device storing a plurality of instructions which, when executed by the at least one processor, cause the at least one processor to:

store one or more images of at least one individual person;

synchronize the activation of the at least one illumination device with the camera;

automatically trigger the activation of the camera when a trapezoidal frame of a front windshield of a moving vehicle is maximized within the fixed field of view;

compare at least one image captured by the camera of at least one vehicle occupant present within a vehicle interior enclosure of a vehicle, with the one or more stored images of the at least one individual person, wherein the at least one image is captured by the camera through the linear polarization filter and a window of a vehicle; and determine whether the at least one vehicle occupant and the at least one individual person are the same.

18. The system of claim 17, wherein the at least one image captured by the camera is taken from a plurality of current facial images of the at least one vehicle occupant, and wherein each of the plurality of current facial images is captured from a different distance to the vehicle.

19. The system of claim 18, wherein the plurality of instructions, when executed by the at least one processor, further cause the at least one processor to determine the number of vehicle occupants in the vehicle interior enclosure based upon the captured plurality of current facial images.

20. The system of claim 17, wherein the camera further includes an optical bandpass filter secured such that the lens is secured between the optical bandpass filter and the linear-polarization filter.

21. The system of claim 17, wherein the plurality of instructions, when executed by the at least one processor, further cause the at least one processor to authenticate the at least one vehicle occupant for access to an access-controlled asset based upon the step of comparing, and further based upon one or more of: a detected license plate number, an undervehicle image, and a readable tag on the vehicle.

22. The system of claim 17, wherein the camera and the illumination device are located external to the vehicle.

* * * * *